(12) United States Patent
Cailleteau et al.

(10) Patent No.: US 12,128,602 B2
(45) Date of Patent: Oct. 29, 2024

(54) METHOD FOR MANUFACTURING AN AIRCRAFT SEAT PART

(71) Applicant: Safran Seats, Plaisir (FR)

(72) Inventors: Jeremy Cailleteau, Moissy-Cramayel (FR); Antonio Lopes, Moissy-Cramayel (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 18/293,483

(22) PCT Filed: Jul. 20, 2022

(86) PCT No.: PCT/EP2022/070322
§ 371 (c)(1),
(2) Date: Jan. 30, 2024

(87) PCT Pub. No.: WO2023/006536
PCT Pub. Date: Feb. 2, 2023

(65) Prior Publication Data
US 2024/0262029 A1    Aug. 8, 2024

(30) Foreign Application Priority Data

Jul. 30, 2021  (FR) ..................................... 2108364

(51) Int. Cl.
*B29C 51/12* (2006.01)
*B29C 51/10* (2006.01)
(Continued)

(52) U.S. Cl.
CPC ............ *B29C 51/12* (2013.01); *B29C 51/105* (2013.01); *B29C 51/18* (2013.01); *B29C 51/266* (2013.01);
(Continued)

(58) Field of Classification Search
CPC ......... B29C 51/02; B29C 51/14; B29C 51/26; B29C 51/08; B29C 51/30; B29C 51/32;
(Continued)

(56) References Cited

U.S. PATENT DOCUMENTS

2004/0231783 A1  11/2004  Lima
2015/0068435 A1   3/2015  Maslakow
(Continued)

FOREIGN PATENT DOCUMENTS

DE    10350787 A1    5/2005

OTHER PUBLICATIONS

International Patent Application No. PCT/EP2022/070322, International Search Report, Translation of International Search Report, Written Opinion, and Translation of Written Opinion dated Oct. 25, 2022.
(Continued)

*Primary Examiner* — Sonya M Sengupta
(74) *Attorney, Agent, or Firm* — Kilpatrick Townsend & Stockton LLP (57) ABSTRACT

A method for manufacturing a part for an aircraft seat includes positioning a heating frame around a stacked structure, locally heating an edge of the stacked structure using a heating frame, externally heating the entire stacked structure, positioning the stacked structure inside a thermoforming mould provided with cutting punches, closing the thermoforming mould and applying a vacuum to the interior of the thermoforming mould, to simultaneously perform, during the same step of shaping the first cover and the second cover, a step of heat sealing an edge of the first cover to an edge of the second cover, bonding the first cover and the second cover to the foam core, and cutting the stacked structure along the circumference thereof using cutting punches.

14 Claims, 8 Drawing Sheets

(51) Int. Cl.
| | |
|---|---|
| B29C 51/18 | (2006.01) |
| B29C 51/26 | (2006.01) |
| B29C 51/42 | (2006.01) |
| B29D 99/00 | (2010.01) |
| B29K 27/06 | (2006.01) |
| B29K 69/00 | (2006.01) |
| B29K 75/00 | (2006.01) |
| B29K 105/04 | (2006.01) |
| B29L 31/00 | (2006.01) |
| B29L 31/30 | (2006.01) |
| B32B 5/18 | (2006.01) |
| B32B 7/12 | (2006.01) |
| B32B 27/06 | (2006.01) |
| B64D 11/06 | (2006.01) |

(52) U.S. Cl.
CPC .......... *B29C 51/42* (2013.01); *B29D 99/0092* (2013.01); *B32B 5/18* (2013.01); *B32B 7/12* (2013.01); *B32B 27/065* (2013.01); *B29K 2027/06* (2013.01); *B29K 2069/00* (2013.01); *B29K 2075/00* (2013.01); *B29K 2105/04* (2013.01); *B29L 2031/3076* (2013.01); *B29L 2031/771* (2013.01); *B32B 2250/03* (2013.01); *B32B 2250/40* (2013.01); *B32B 2605/003* (2013.01); *B32B 2605/18* (2013.01); *B64D 11/0638* (2014.12)

(58) Field of Classification Search
CPC ......... B29C 51/42; B29C 51/12; B29C 51/38; B29C 51/10; B64D 11/06; B29K 69/00; B29K 27/06; B29K 105/04; B29L 31/44; B29L 31/30; B29L 31/00; B29L 9/00
See application file for complete search history.

(56) References Cited

U.S. PATENT DOCUMENTS

| | | |
|---|---|---|
| 2015/0174799 A1 | 6/2015 | Sumi |
| 2015/0343699 A1 | 12/2015 | Rayama |
| 2018/0281299 A1 | 10/2018 | Maslakow |

OTHER PUBLICATIONS

International Patent Application No. PCT/EP2022/070322, English translation International Preliminary Report on Patentability (Written Opinion of the International Searching Authority), dated Jan. 18, 2024.

METHOD FOR MANUFACTURING AN AIRCRAFT SEAT PART

CROSS REFERENCE TO RELATED APPLICATIONS

This application is the United States national phase application of International Patent Application PCT/EP2022/070322 ("the '322 application"), filed on Jul. 30, 2022 and titled "METHOD FOR MANUFACTURING AN AIRCRAFT SEAT PART," which application is related to and claims priority benefits of France Patent Application No. 2108364, ("the '364 application"), filed on Jul. 30, 2021. The '322 and '364 applications are hereby incorporated in their entireties by this reference.

The present invention relates to a method for manufacturing part for an aircraft seat. The invention finds a particularly advantageous, but not exclusive, application with the manufacture of dining shelves for aircraft seats of economical type.

Figure 1:
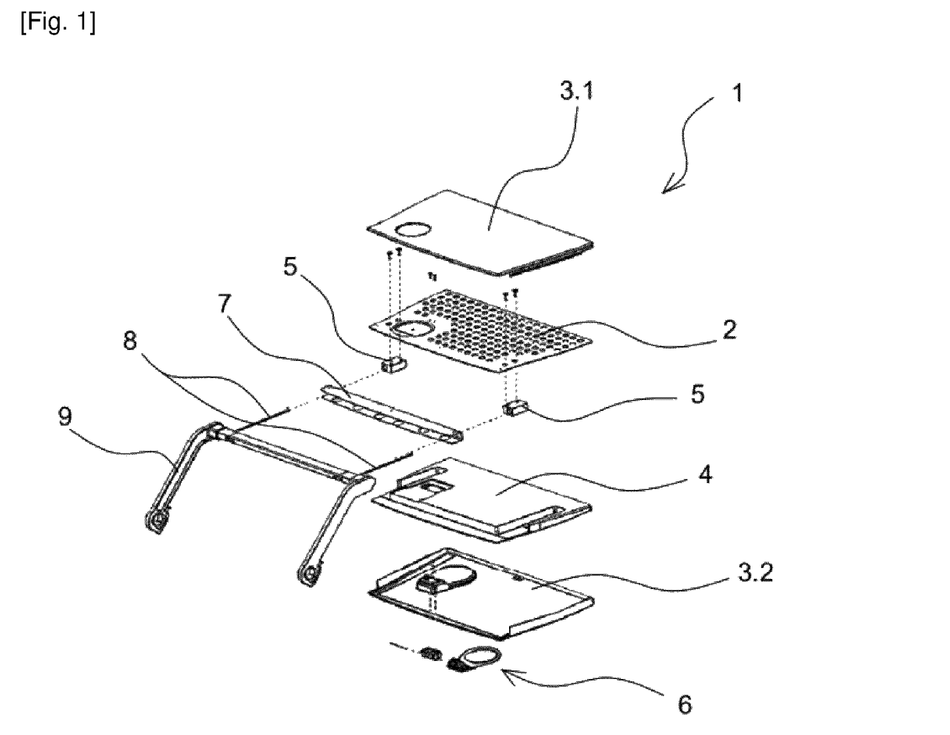
FIG. 1, already described, is an exploded perspective view of a tray table for an aircraft seat according to the state of the art.

FIG. 1 shows a tray table 1 according to the state of the art, comprising a sheet metal 2 as well as two covers 3.1, 3.2 assembled with a core 4 made of foam.

Generally, the covers 3.1, 3.2 made from a thermoplastic material are shaped by a thermoforming process then cut out in a subsequent step. Mechanisms such as slides 5, attachments for a cup holder device 6, or locking systems for holding these elements in position are also mounted on the sheet metal 2. A U-shaped profile 7 may extend along a longitudinal edge of the tray table. The tray table 1 is configured to cooperate with rods 8 of a support 9 to be fixed to an aircraft seat back.

The assembly of the different components of the tray table 1 (the covers 3.1, 3.2, the foam core 4, and the sheet metal 2 equipped with the different mechanisms) is carried out by a gluing operation. The mechanical connection of the covers 3.1, 3.2 to one another is thus carried out by gluing along the edges thereof which overlap with each other.

Such a manufacturing process, however, requires the use of numerous tools for shaping the covers as well as for assembling the whole. In addition, all assembling, adjusting and gluing operations are carried out manually, which are tedious and not very repeatable.

Numerous failures have been observed during tests or during the operational phase due to repeatability problems and poor performance of adhesives, the choice of which is limited due to the substrates used.

The overall finish is also poor due to the overlap of the edges of the two covers, often causing the presence of glue burrs. In addition, the sheet metal used to guarantee the correct positioning of the mechanisms increases the weight of the whole.

The invention aims to effectively remedy the aforementioned drawbacks by proposing a method for manufacturing a part for an aircraft seat comprising:
- a step of positioning a heating frame around a stacked structure comprising a foam core, a first cover and a second cover made of a thermoplastic material and arranged on either side of the foam core, a first film of hot melt glue between the first cover and the foam core and a second film of hot melt glue between the second cover and the foam core,
- a step of locally heating at least one edge of the stacked structure with the help of a heating frame,
- a step of externally heating the entire stacked structure,
- a step of placing the stacked structure inside a thermoforming mold equipped with cutting punches,
- a thermoforming step by closing the thermoforming mold and applying vacuum inside the thermoforming mold, so as to shape the first cover and the second cover, heat seal at least one edge of the first cover and at least one edge of the second cover to one another, bond the first cover and the second cover to the foam core, and cut the stacked structure along the circumference thereof with the help of the cutting punches simultaneously during the same step.

The invention thus makes it possible to carry out, during the thermoforming step, an assembly of the different layers of material of the part while carrying out a cutting step. The invention therefore reduces the manufacturing time as well as the number of tools necessary to shape the part. The invention also makes it possible to reduce the weight of the assembly by eliminating the structural metal sheet. In addition, by replacing the manual gluing of the edges of the thermoplastic covers with the sealing of these edges during the thermoforming step, operator-induced failures are eliminated and the finish of the part is improved.

According to one implementation of the invention, prior to the local heating step, said method comprises a step of placing at least one functional insert to be mechanically connected with the stacked structure during the thermoforming step. This makes it possible to obtain at the end of the mold an aircraft seat part integrating at least one part and preferably all of the functions thereof.

According to one implementation of the invention, the functional insert is fixed into position on the heating frame so as to guarantee a correct positioning of said functional insert relative to the stacked structure.

According to one implementation of the invention, the local heating step for the edge of the stacked structure is started before the external heating step for the entire stacked structure.

According to one implementation of the invention, the local heating step for the edge of the stacked structure and the external heating step for the entire stacked structure are started at the same time.

According to one implementation of the invention, the local heating step for the edge of the stacked structure is started when the external heating is stabilized at a temperature level.

According to one implementation of the invention, the external heating step for the entire stacked structure is carried out in two isothermal levels.

According to one implementation of the invention, when a heating member of the heating frame has reached a temperature compatible with the heat sealing and cutting of the edge of the first cover and the second cover and a temperature of a central part of the stacked structure is homogeneous, the process includes a step of stopping the external heating and the local heating with the help of the heating frame. The heating member is configured so as to heat only the zone close to the zones to be sealed in order to limit thermal inertia and energy consumption as much as possible.

According to one implementation of the invention, said method comprises a step of cooling the part obtained during the thermoforming step in order to stabilize the thermoforming of the covers, the bonding of the covers to the foam core, and the heat sealing of the edges of the covers to one another.

According to one implementation of the invention, the cooling step is carried out by moldings of the mold stabilized at a temperature lower than a solidification temperature of a material of the covers.

According to one implementation of the invention, the cooling step is carried out by regulating the temperature of the mold from a transformation temperature to a temperature lower than a solidification temperature of a material of the covers.

According to one implementation of the invention, the external heating of the stacked structure is carried out by a dedicated external heating cell or by using hot/cold temperature regulation of the mold cavities. In other words, we can use the moldings of the mold itself in the open position to heat the stacked structure.

According to one implementation of the invention, the moldings of the mold can be grained and/or marked so as to obtain a texture and/or markings on the external faces of the covers of the stacked structure.

The invention also relates to a part for an aircraft seat obtained with the method such as previously defined.

According to one embodiment of the invention, the part for an aircraft seat can be chosen from a tray table, a backrest, a seating surface, a headrest, or a privacy shell panel.

The present invention will be better understood and other characteristics and advantages will become apparent on reading the following detailed description comprising embodiments given by way of illustration with reference to the appended figures, presented by way of non-limiting examples, which may be used to complete the understanding of the present invention and the presentation of its realization and, if necessary, contribute to its definition, wherein:

Figure 2:
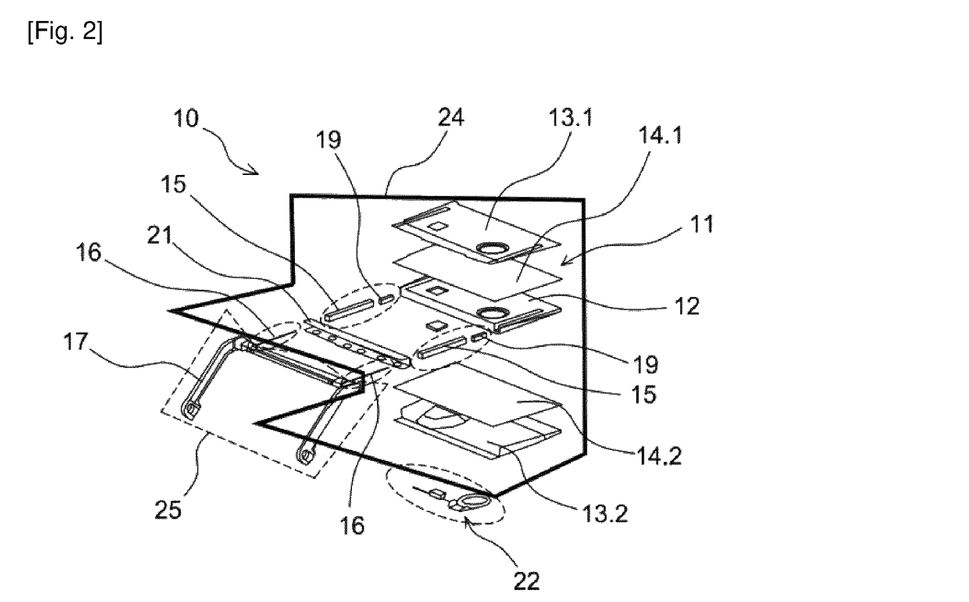
FIG. 2 is an exploded perspective view of a tray table for an aircraft seat according to the present invention.

It should be noted that, in FIG. 2 and the following figures, the structural and/or functional elements common to the different embodiments have the same references. Thus, unless otherwise stated, such elements have identical structural, dimensional and material properties.

FIG. 2 shows an exploded perspective view of a tray table 10 for an aircraft seat comprising a plate formed by a stacked structure 11, so-called a "sandwich structure" formed by a stack of different layers of materials. In this case, the stacked structure 11 is formed by a foam core 12, a first cover 13.1 and a second cover 13.2 made of a thermoplastic material, and films of hot melt glue 14.1, 14.2 arranged between the covers 13.1, 13.2 and the foam core 12. The films of hot melt glue 14.1, 14.2 are formed by a glue capable of melting at high temperature.

The foam core 12 can be obtained by machining a block of foam or by expanding a polyurethane foam material inside a mold so as to be preformed in order to be assembled with or without a slight extra thickness for improving bonding to covers 13.1, 13.2. The first cover 13.1 and the second cover 13.2 can be made from thermoforming plates in polycarbonate (PC) or polyvinyl chloride (PVC) with thicknesses between 1 and 3 mm.

The tray table 10 further comprises two slides 15 each for cooperating with a rod 16 of a shelf support 17 mounted on a seat back. The shelf support 17 is articulated so as to be able to move the tray table 10 from a stored position in which the tray table 10 is pressed against a rear face of the backrest to a deployed position in which the tray table 10 has a substantially horizontal orientation to allow for the passenger to place a dining plate or objects thereon. The slides 15 and the rods 16 ensure translational movement of the tray table 10 relative to the support 17 when the tray table 10 is in the deployed position. The positioning of the tray table 10 can thus be adapted to the morphology of the passenger. The slides 15 are associated with pads 19. Preferably, a slide 15 has a parallelepiped body so as to be able to be housed between a molding in the foam core 12 and a cover 13.1, 13.2 so as to limit any recess and shape defect during thermoforming of the covers 13.1, 13.2 and to present good support for bonding.

The tray table 10 also includes a U-shaped profile 21 extending along a longitudinal edge. The profile 21 may be made of a metallic material, in particular aluminum, or a plastic material, in particular polycarbonate (PC).

We could also provide a cup holder device 22 fixed on a rear face of the tray table 10 and usable when the tray table 10 is in the stored position.

The components surrounded by the solid line 24 are used in the manufacturing method according to the invention. The components surrounded by the broken line 25, namely the shelf support 17 and the cup holder device 22, are not involved in this method. However, an insert for fixing the cup holder 22 could be integrated during the manufacture of the stacked structure 11 forming the plate of the tray table 10.

We describe below, with reference to FIGS. 5a to 5e, the different steps of manufacturing the tray table 10 according to the invention.

Figure 5A:
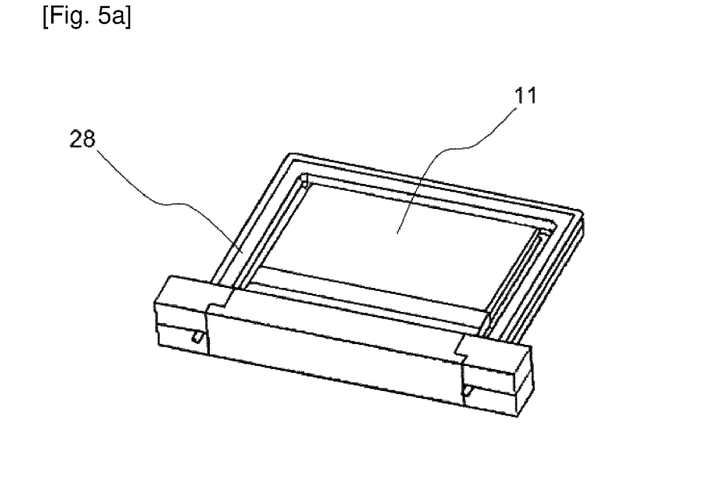
FIGS. 5a to 5e illustrate the different steps of the method of manufacturing a tray table for an aircraft seat according to the present invention.

As illustrated in FIG. 5a, a heating frame 28, which could also be called a "mobile frame", is arranged around the stacked structure 11 comprising the foam core 12, the first cover 13.1 and the second cover 13.2 arranged on either side of the foam core 12, a first film of hot melt glue 14.1 between the first cover 13.1 and the foam core 12, and a second film of hot melt glue 14.2 placed between the second cover 13.2 and the foam core 12. The stacked structure 11 is thus formed by the stacking of the following elements: cover 13.1—glue film 14.1—foam core 12—glue film 14.2—cover 13.2. The different elements between the covers 13.1, 13.2 are sandwiched between two adjacent elements.

Figure 3:
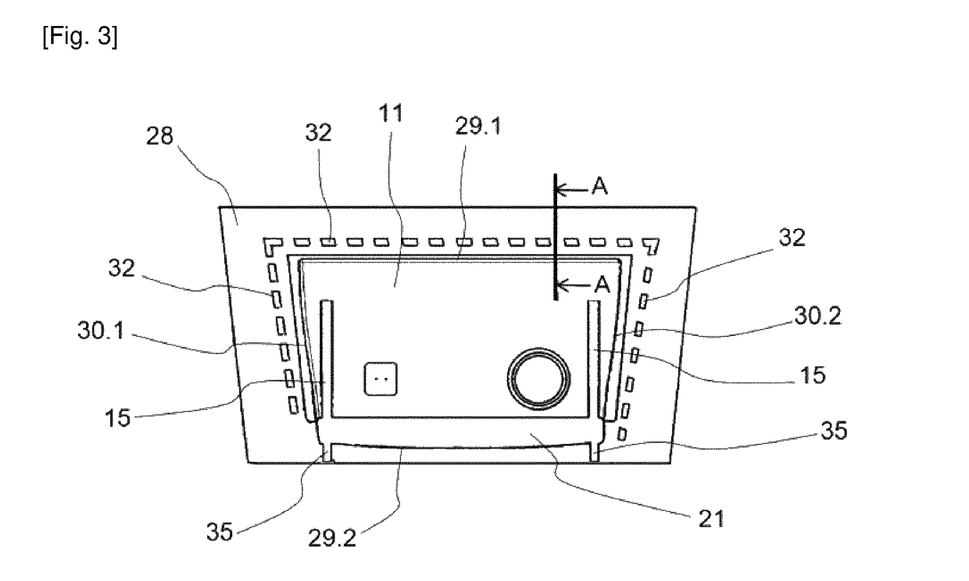
FIG. 3 is a top view of a heating frame arranged around a stacked structure of the tray table according to the invention.

As can be seen in FIG. 3, the movable frame 28 extends along two longitudinal edges 29.1, 29.2 and two transverse edges 30.1, 30.2 of the stacked structure 11. The movable frame 28 is provided with one or more heating member 32, such as one or more electrical resistances. The heating member(s) 32 are configured to ensure local heating of the edges of the stacked structure 11, in particular the longitudinal edge 29.1 and the two transverse edges 30.1, 30.2. The heating member(s) 32 are configured so as to heat only the zone close to the zones to be sealed in order to limit thermal inertia and energy consumption as much as possible. In other applications, the heating frame 28 may be configured to heat a different number of edges of the stacked structure 11. Advantageously, the heating frame 28 includes a vacuum keeping system making it possible to guarantee the application of vacuum inside the mold 39 during the thermoforming step.

This is particularly well suited to a tray table 10 comprising a profile 21 made of metal positioned along the longitudinal side, insofar as it is not necessary to heat this side to ensure a sealing connection between the edges of the two covers 13.1, 13.2. Such local heating of the edges of the stacked structure 11 makes it possible to obtain a high temperature at the edge of the covers 13.1, 13.2 in order to allow the sealing of the covers 13.1, 13.2 to one another when they come into contact and to facilitate the subsequent cutting of the covers 13.1, 13.2 and this without degrading the material and the surface condition of the part. Alternatively, in the case where the profile 21 is made of a thermoplastic material, the heating frame 28 ensures heating of the 4 edges 29.1, 29.2, 30.1, 30.2 of the stacked structure 11.

Figure 4:
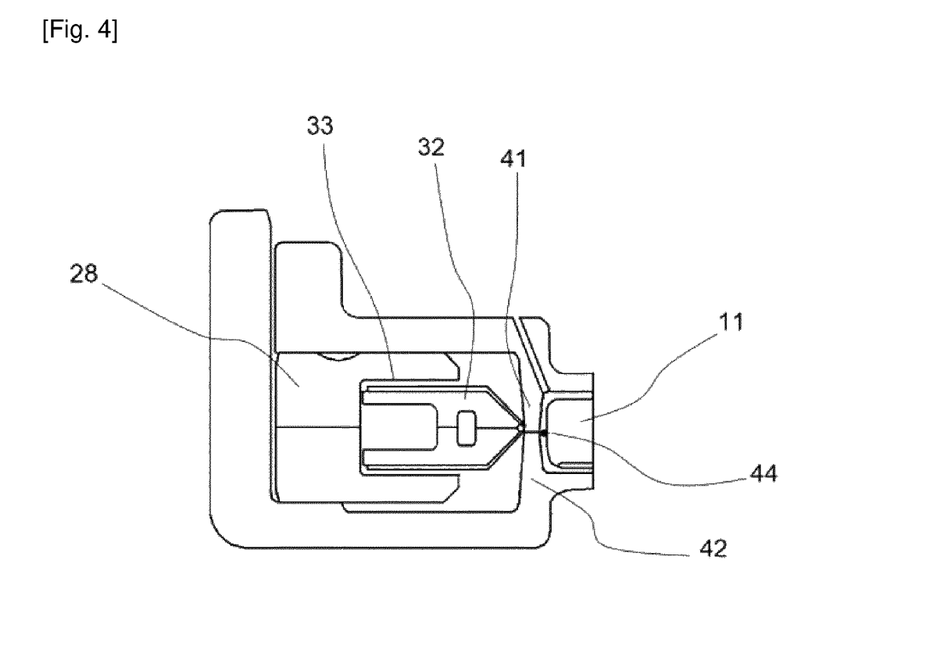
FIG. 4 is a sectional view along the plane A-A in FIG. 3 showing the integration of a heating resistor inside the heating frame.

As illustrated in FIG. 4, a heating member 32 is arranged inside a groove 33 in the heating frame 28. The heating member 32 may have a pointed shape so as to precisely heat a corresponding edge 29.1, 29.2, 30.1, 30.2 of the stacked structure 11 along which the heating member 32 extends.

The heating frame 28 can also ensure a process of indexing in position of one or more functional inserts relative to the stacked structure 11 so as to guarantee correct positioning of the insert(s) inside the part at the end of the method. Thus, a rod 16 can be fixed into position on the heating frame 28 via a shape 35 visible in FIG. 3, such as a housing in the heating frame 28 for receiving one end of the rod 16. The slides 15 fixed on the rods 16 can be positioned on shapes machined in the foam core 12.

By "functional insert" it is meant any added element to be mechanically linked to the stacked structure 11 in order to ensure a particular function (fixing, reinforcement, articulation, slide, locking, or other). The functional inserts take the form of rods and slides for the manufacture of a tray table 10 but they could take the form of other elements for the manufacture of another seat element, as explained in more detail below.

The frame 28 is configured to ensure that the various elements of the stacked structure 11 are held in place during the handling phases and allow the application of vacuum inside the mold 39 during the thermoforming phase.

Figure 5B:
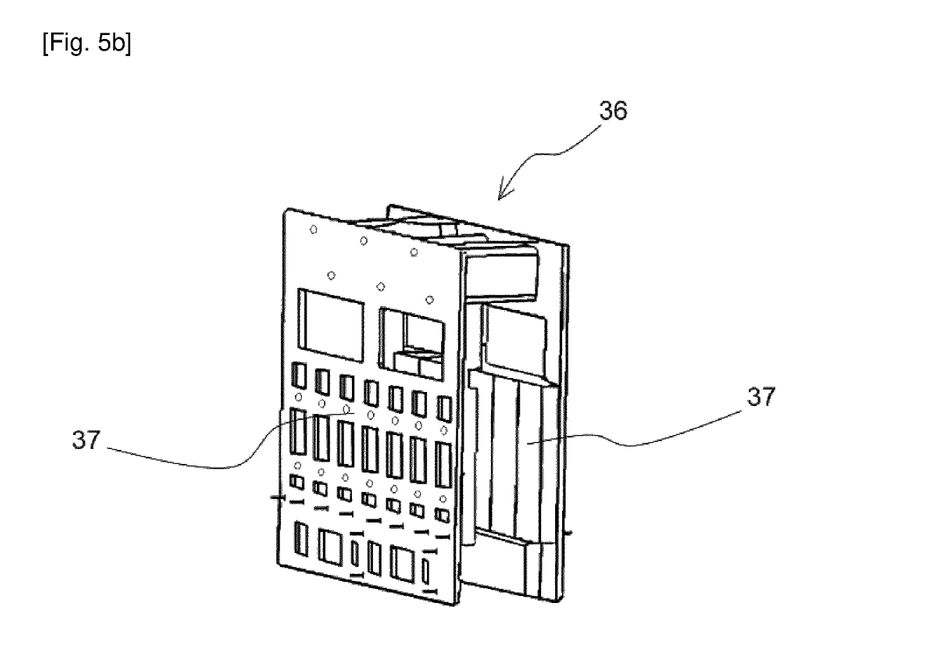

FIG. 5b shows an external heating cell 36 for carrying out an external heating step of the entire stacked structure 11. For this purpose, the heating cell 36 comprises two heating walls 37 to be positioned on either side of the stacked structure 11. The heating cell 36 advantageously provides radiation heating of the entire stacked structure 11 via ceramic walls. The external heating cell 36 can be mobile or fixed.

Figure 5C:
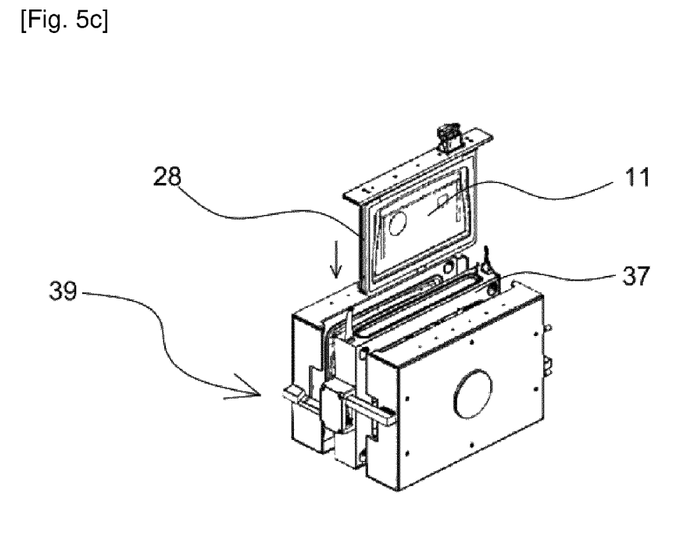

As can be seen in Figure 5c, the heating frame 28 and the stacked structure 11 are placed inside a thermoforming mold 39. The thermoforming mold 39 is equipped with cutting punches 41, 42 visible in FIG. 4. The cutting punches 41, 42 extend along at least one edge of the covers 13.1, 13.2. The cutting punch 41 is secured to an upper cavity of the mold 39 and the cutting punch 42 is secured to a lower cavity of the mold 39.

The geometry of the cutting punches 41, 42 can be adapted according to the materials used, the thermal cycle applied, and the geometry of the desired final product.

Figure 7A:
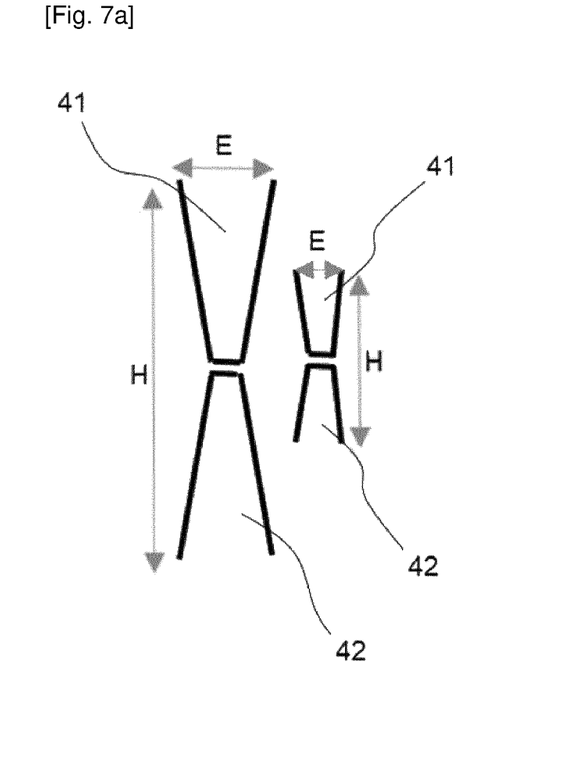
FIGS. 7a to 7d are schematic sectional views illustrating different possible geometries of the cutting punches integrated into the thermoforming mold.

Thus, as illustrated in FIG. 7a, a height H and a thickness E of the punches 41, 42 may vary from one application to another.

Figure 7B:
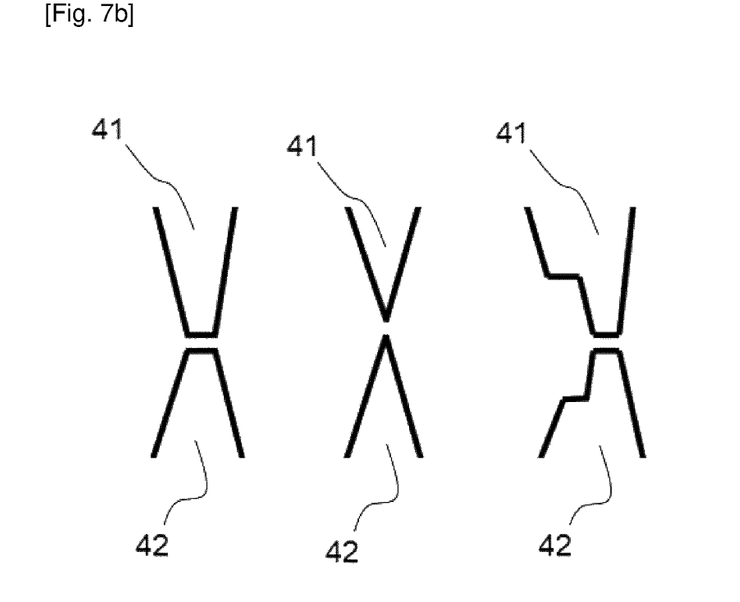

As illustrated in FIG. 7b, the contact zone between the punches 41, 42 may be flat, acute for pointed punches, or of complex shape with an offset from the main contact zone.

Figure 7C:
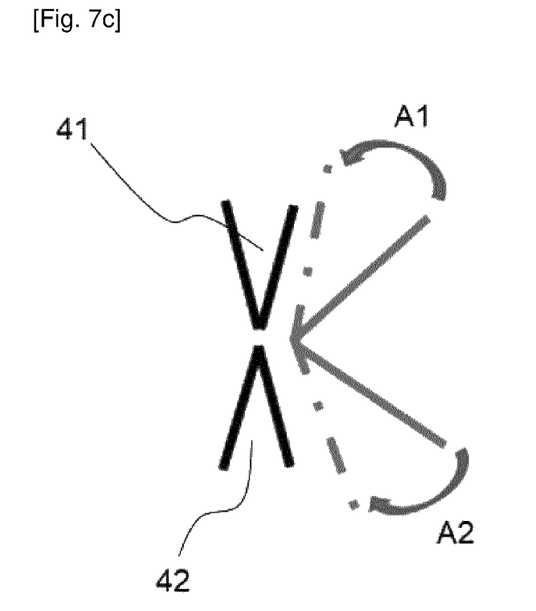

As illustrated in FIG. 7c, an opening angle A1, A2 of the punches 41, 42 may also vary according to the application.

Figure 7D:
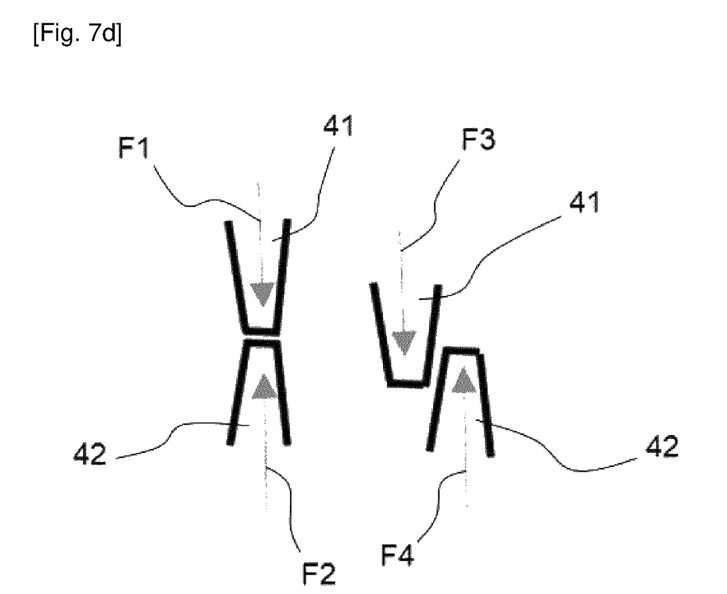

As illustrated in FIG. 7d, the contact kinematics of the punches 41, 42 could be a flat contact one along arrows F1 and F2 or a shearing one along arrows F3 and F4.

It should be noted that in an alternative implementation of the method, the external heating of the stacked structure 11 could be carried out using hot/cold temperature regulation of the mold cavities 39. In other words, the mold cavities 39 itself could be used in a slightly open position in order to heat the stacked structure 11.

Figure 5D:
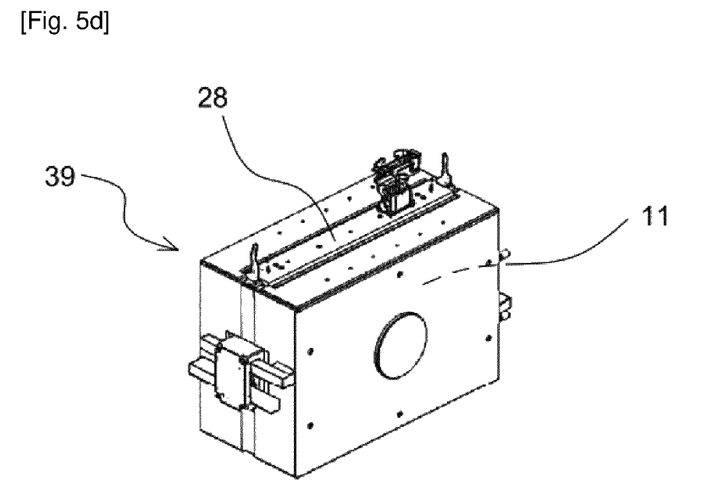

As illustrated by FIG. 5d, the method comprises a thermoforming step carried out by closing the mold 39 and applying vacuum inside the mold 39. Thermoforming is a "double-sided" thermoforming carried out by the moldings of the mold 39 on the two covers 13.1, 13.2 each at one end of the stacked structure 11. We then carry out simultaneously, during the same step, a process of shaping the first cover 13.1 and the second cover 13.2, a process of heat sealing the edges of the first cover 13.1 and the edges of the second cover 13.2 to one another, a process of cutting the stacked structure 11 along its circumference with the help of cutting punches 41,42, a process of gluing the first cover 13.1 and second cover 13.2 on the foam core 12, and a mechanical connection of the slides 15 to the stacked structure 11.

Thus, the materials of the two covers 13.1, 13.2 are sealed at the edges under the action of heat to form a seal bead 44 along the edges thereof (see FIG. 4). The seal bead 44 has a mechanical strength adapted to the lifespan requirements of the product. The geometry of the seal bead 44 formed between the two covers 13.1, 13.2 depends on the shape of the cutting punches 41, 42 as well as the closing speed parameter of the thermoforming mold 39.

The foam core 12 may have a slight extra thickness, so that the closure of the mold 39 slightly crushes the foam core 12 to improve the bonding of the covers 13.1, 13.2 on the foam core 12 via the adhesive films 14.1, 14.2.

The method also includes a step of cooling the part obtained during the thermoforming step in order to stabilize the thermoforming of the covers 13.1, 13.2, the bonding of the covers 13.1, 13.2 on the foam core 12, and the heat sealing of the edges of the covers 13.1, 13.2 to one another. This cooling step can be carried out either with the help of moldings of the mold 39 stabilized at a temperature lower than the solidification temperature of a material of the covers 13.1, 13.2, or by temperature regulation of the mold 39 from a transformation temperature to a temperature lower than a solidification temperature of a material of the covers 13.1, 13.2. For this purpose, the mold 39 may include a liquid cooling network integrated into the moldings.

Figure 5E:
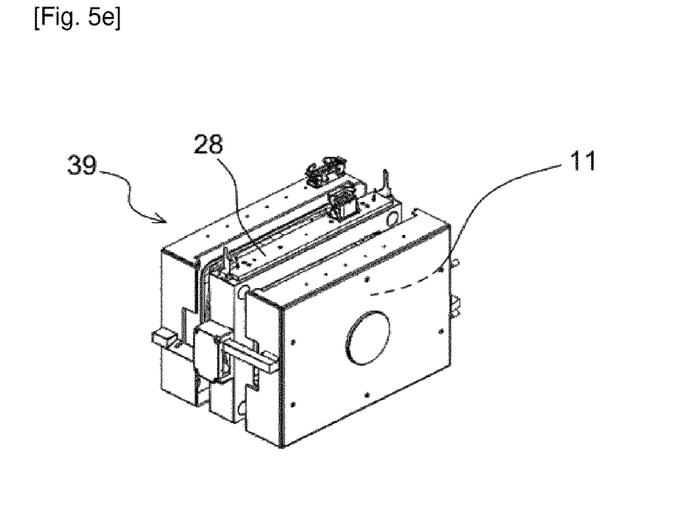

Once the thermoforming mold 39 is opened as shown in FIG. 5e and the heating frame 28 is removed, the tray table 10 is in its final finished state with the integration of all its functions.

The moldings of the mold 39 may be grained and/or marked so as to obtain a texture and/or markings on the external faces of the covers 13.1, 13.2.

We describe below, with reference to FIGS. 6a to 6c, different possible thermal cycles for implementing the manufacturing method according to the invention. The temperatures indicated may vary according to the material used for the different components. The temperature values indicated below are particularly well suited for covers 13.1, 13.2 made of polycarbonate (PC), a foam core made of a Polyethersulfone (PES) material as well as adhesive films 14.1, 14.2 based on polyester.

In these Figures, the curve C1 corresponds to the temperature of the material of the stacked structure 11. The curve C2 corresponds to the temperature of the heating frame 28. The curve C3 corresponds to the temperature of the heating cell 36. The curve C4 corresponds to the temperature of the thermoforming mold 39. The curve C5 corresponds to the state of the thermoforming mold 39. When the curve C5 is at state 0, the mold 39 is open while when the curve is at state 1, the mold 39 is closed and the vacuum is applied inside the mold 39.

Figure 6A:
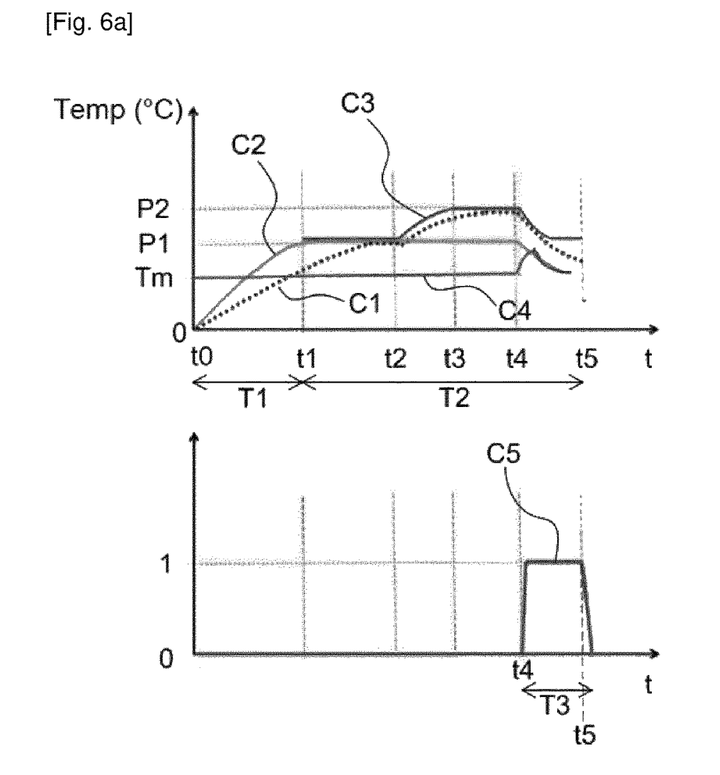
FIGS. 6a to 6c show the evolution, as a function of time, of the temperature of the material, the heating frame, an external heating cell, and a thermoforming mold for different possible thermal cycles for the implementation of the manufacturing process according to the invention.

In the implementation in FIG. 6a, the step of local heating of the edges of the stacked structure 11 (see curve C2) is started before the step of external heating of the entire stacked structure 11 (see. curve C3).

Thus, between times t0 and t1, the heating frame 28 ensures local heating of the edges of the stacked structure 11. The temperature of the mold 39 remains constant at a temperature Tm between 70 and 120° C.

From time t1, the external heating of the stacked structure 11 begins (see curve C3). The external heating temperature and the temperature of the heating frame 28 are maintained at an isothermal level P1 between 130 and 170° C. between times t1 and t2.

Between times t2 and t3, the temperature of the heating frame 28 (see curve C2) is maintained constant at the isothermal level between 130° C. and 170° C., while the temperature of the external heating cell 36 increases up to a second isothermal level P2 between 180° C. and 230° C. (see curve C3).

Between times t3 and t4, the temperature of the external heating cell 36 is maintained constant at the second isothermal level P2 in order to guarantee an optimal thermoforming of the covers 13.1, 13.2.

At time t4, when the heating frame 28 has reached a temperature compatible with the heat sealing and cutting of the edges of the first cover 13.1 and the second cover 13.2 and when a temperature of a central part of the stacked structure 11 is homogeneous, the heating of the heating frame 28 (see curve C2) and the external heating of the heating cell 36 (see curve C3) are stopped. The mold 39 is then closed and vacuum is applied inside the mold 39 during the thermoforming step (see curve C5). This step during which the covers 13.1, 13.2 are shaped, the edges of the covers 13.1, 13.2 are heat-sealed, the stacked structure 11 is cut out and the functional inserts of the tray table 10 are integrated, lasts until time t5. In addition, between times t4 and t5, the mold 39 cools the tray table 10 down to an unmolding temperature.

The cooling of the part is thus carried out in the mold 39 having a temperature lower than a solidification temperature of a material of the covers 13.1, 13.2. The temperature and cooling speed can be adapted according to the materials used.

At time t5, the mold 39 is opened and the suction process is stopped. The part can then be removed from the mold 39.

The duration T1 of preheating the edges by the heating frame 28 may be between 5 and 15 minutes. The duration T2 of cycle time could also be between 10 and 15 minutes. The duration T3 of closing the mold 39 and applying the vacuum is between 2 and 5 minutes.

Figure 6B:
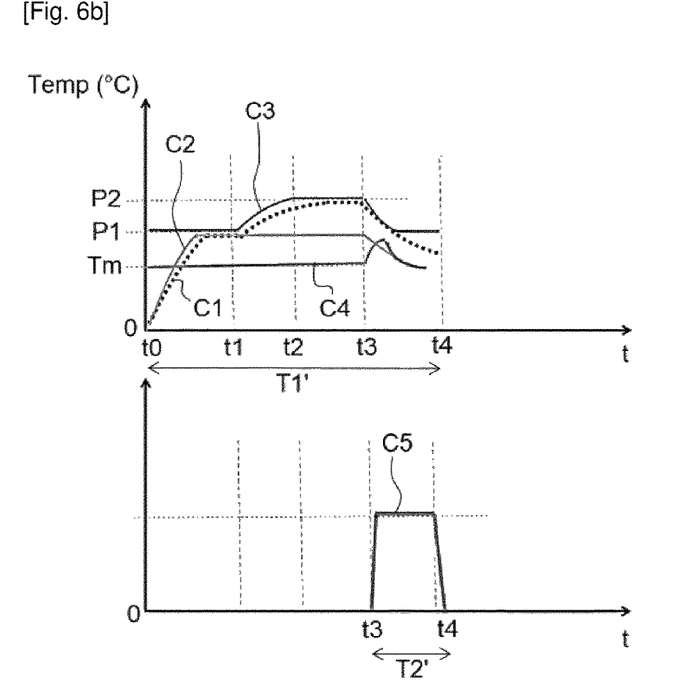

In the implementation in FIG. 6b, the step of local heating of the edges of the stacked structure 11 (see curve C2) and the step of external heating of the entire stacked structure 11 (see curve C3) are started at the same time.

Thus, between times t0 and t1, the heating frame 28 and the heating cell 36 are activated until the material reaches an isothermal level P1 between 130 and 170° C. The temperature Tm of the mold 39 remains constant at a temperature between 70 and 120° C.

Between times t1 and t2, the temperature of the heating frame 28 is maintained constant at the isothermal level P1 (see curve C2), while the temperature of the heating cell 36 (see curve C3) increases up to a second isothermal level P2 between 180° C. and 230° C.

Between times t2 and t3, the temperature of the external heating cell 36 (see curve C3) is maintained constant at the second isothermal level P2 in order to guarantee an optimal thermoforming of the covers 13.1, 13.2.

At time t3, when the heating member(s) 32 have reached a temperature compatible with the heat sealing and cutting of the edges of the first cover 13.1 and the second cover 13.2 and a temperature of a central part of the stacked structure 11 is homogeneous, the heating of the heating frame 28 (see curve C2) and the external heating of the heating cell 36 (see curve C3) are stopped. The mold 39 is then closed and vacuum is applied inside the mold 39 during the thermoforming step (see curve C5). The thermoforming step lasts until time t4. In addition, between times t3 and t4, the mold 39 cools the tray table 10 down to the unmolding temperature. At time t4, the mold 39 is opened and the suction process is stopped. The part can then be removed from the mold 39.

The duration T1' of cycle time could also be between 5 and 15 minutes. The duration T2' of closing the mold 39 and applying the vacuum is between 2 and 5 minutes.

Figure 6C:
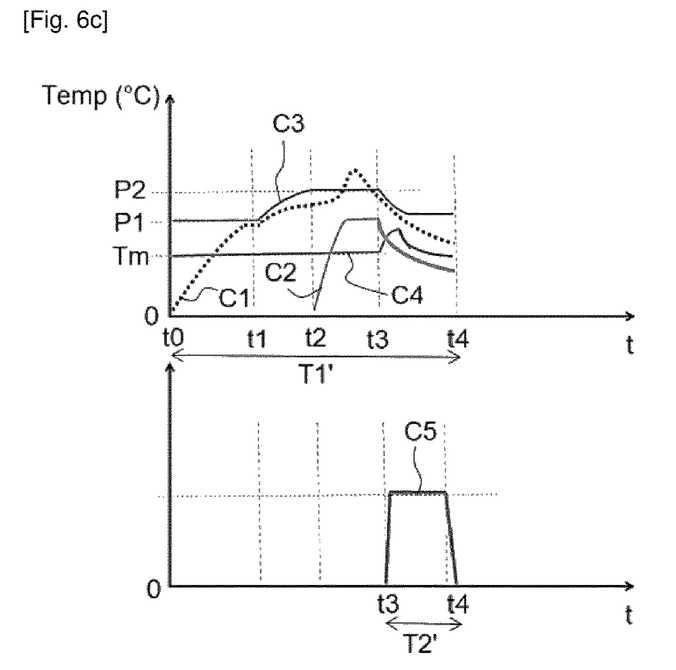

In the implementation in FIG. 6c, the local heating step for the edges of the stacked structure 11 (see curve C2) is started when the external heating is stabilized at the temperature level P2 (see curve C3).

More precisely, between times t0 and t1, the external heating cell 36 (see curve C3) is activated until the material reaches a first isothermal level P1 between 130 and 170° C. (see curve C1). The temperature of the mold 39 remains constant at a temperature Tm between 70 and 120° C.

Between times t1 and t2, the temperature of the external heating cell 36 (see curve C3) increases up to a second isothermal level P2 between 180° C. and 230° C.

Between times t2 and t3, the temperature of the external heating cell 36 is maintained constant at the second isothermal level P2 while the heating frame 28 is activated (see curve C2) in order to obtain a high temperature of the material guaranteeing a optimal thermoforming of the covers 13.1, 13.2.

At time t3, when the heating member(s) 32 have reached a temperature compatible with the heat sealing and cutting of the edges of the first cover 13.1 and the second cover 13.2 and a temperature of a central part of the stacked structure 11 is homogeneous, the heating of the heating frame 28 (see curve C2) and the external heating of the heating cell 36 (see curve C3) are stopped. The mold 39 is then closed and vacuum is applied inside the mold 39 during the thermoforming step (see curve C5). The thermoforming step lasts until time t4. In addition, between times t3 and t4, the mold 39 cools the tray table 10 down to an unmolding temperature. At time t4, the mold 39 is opened and the suction process is stopped. The part can then be removed from the mold 39.

The duration T1' of cycle time could also be between 10 and 15 minutes. The duration T2' of closing the mold 39 and applying the vacuum T3 is between 2 and 5 minutes.

It should be noted that in all cases, the external heating step for the entire stacked structure 11 (see curve C3) is carried out with the two isothermal levels P1 and P2. This ensures a gradual heating of the material while avoiding deterioration thereof.

Alternatively, the external heating is carried out directly in the mold 39 in the open state as explained previously.

The method has been described for the production of a tray table 10 but this method could also be implemented with any other aircraft seat part having a so-called "sandwich" structure in which several layers of different materials are stacked, such as for example a seating surface, a backrest, or a headrest, or a privacy shell panel. Certain parts may integrate various functional inserts 15, such as a fixing rod for a headrest, a reinforcement part or a joint for a backrest or a seating surface. Other parts, in particular the panel of the privacy shell, may be devoid of functional insert 15. The step of indexing a functional insert 15 relative to the heating frame 28 is therefore an optional step of the method.

Of course, the different features, variants and/or embodiments of the present invention can be associated with each other in various combinations as long as they are not incompatible with one another or exclusive from each other.

Furthermore, the invention is not limited to the embodiments described above and provided solely by way of example. It encompasses various modifications, alternative forms and other variants that a person skilled in the art may consider in the context of the present invention and in particular all combinations of the various modes of operation described previously, which may be taken separately or in combination.

The invention claimed is:

1. A method for manufacturing a part for an aircraft seat characterized in that it comprises:
   a step of positioning a heating frame around a stacked structure comprising a foam core, a first cover and a second cover made of a thermoplastic material and arranged on either side of the foam core, a first film of hot melt glue between the first cover and the foam core and a second film of hot melt glue between the second cover and the foam core,
   a step of locally heating at least one edge of the stacked structure with the help of a heating frame,
   a step of externally heating the entire stacked structure,
   a step of placing the stacked structure inside a thermoforming mold equipped with cutting punches,
   a thermoforming step by closing the thermoforming mold and applying vacuum inside the thermoforming mold, so as to shape the first cover and the second cover, heat seal at least one edge of the first cover and at least one edge of the second cover to one another, bond the first cover and the second cover to the foam core, and cut the stacked structure along the circumference thereof with the help of the cutting punches simultaneously during the same step.

2. The method according to claim 1, characterized in that prior to the local heating step, said method comprises a step of placing at least one functional insert to be mechanically connected with the stacked structure during the thermoforming step.

3. The method according to claim 2, characterized in that the functional insert is fixed into position on the heating frame so as to guarantee a correct positioning of said functional insert relative to the stacked structure.

4. The method according to claim 1, characterized in that the local heating step for the edge of the stacked structure is started before the external heating step for the entire stacked structure.

5. The method according to claim 1, characterized in that the local heating step for the edge of the stacked structure and the external heating step for the entire stacked structure are started at the same time.

6. The method according to claim 1, characterized in that the local heating step for the edge of the stacked structure is started when the external heating is stabilized at a level of temperature.

7. The method according to claim 1, characterized in that the external heating step for the entire stacked structure is carried out in two isothermal levels.

8. The method according to claim 1, characterized in that when a heating member of the heating frame has reached a temperature compatible with the heat sealing and the cutting of an edge of the first cover and the second cover and that a temperature of a central part of the stacked structure is homogeneous, the method comprises a step of stopping the external heating and the local heating with the help of the heating frame.

9. The method according to claim 1, characterized in that it comprises a step of cooling the part obtained during the thermoforming step in order to stabilize the thermoforming of the covers, the bonding of the covers to the foam core, and the heat sealing of the edges of the covers to one another.

10. The method according to claim 9, characterized in that the cooling step is carried out by moldings of the mold stabilized at a temperature lower than a solidification temperature of a material of the covers.

11. The method according to claim 9, characterized in that the cooling step is carried out by regulating the temperature of the mold from a transformation temperature to a temperature lower than a solidification temperature of a material of the covers.

12. The method according to claim 1, characterized in that the external heating step is carried out by a dedicated external heating cell or by moldings of the mold in the open state.

13. An aircraft seat part obtained with the method as defined according to claim 1.

14. The aircraft seat part according to claim 13, characterized in that it is chosen from a tray table, a backrest, a seating surface, a headrest, or a privacy shell panel.

* * * * *